US008694195B2

(12) United States Patent
Lee et al.

(10) Patent No.: US 8,694,195 B2
(45) Date of Patent: Apr. 8, 2014

(54) MOTOR VEHICLE HAVING A WHEEL-VIEW CAMERA AND METHOD FOR CONTROLLING A WHEEL-VIEW CAMERA SYSTEM

(75) Inventors: Jonathan Lee, Puyallup, WA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 1520 days.

(21) Appl. No.: 11/949,891

(22) Filed: Dec. 4, 2007

(65) Prior Publication Data

US 2009/0143967 A1      Jun. 4, 2009

(51) Int. Cl.
*G01C 22/00* (2006.01)
*G05D 1/00* (2006.01)

(52) U.S. Cl.
USPC .................. 701/28; 340/436; 340/437

(58) Field of Classification Search
USPC ................. 382/103, 104, 107, 298, 295, 296; 701/117–119; 73/28; 340/148, 937; 348/148; 345/647, 649, 656
See application file for complete search history.

(56) References Cited

U.S. PATENT DOCUMENTS

| | | | |
|---|---|---|---|
| 5,959,555 A | 9/1999 | Furuta | |
| 6,405,975 B1 * | 6/2002 | Sankrithi et al. | 244/1 R |
| 6,580,373 B1 | 6/2003 | Ohashi | |
| 6,801,127 B2 | 10/2004 | Mizusawa et al. | |
| 6,954,152 B1 | 10/2005 | Matthews | |
| 7,161,616 B1 * | 1/2007 | Okamoto et al. | 348/148 |
| 7,248,283 B2 | 7/2007 | Takagi et al. | |
| 7,496,213 B2 * | 2/2009 | Yoshimura | 382/103 |
| 8,049,778 B2 * | 11/2011 | Kuboyama et al. | 348/118 |
| 2003/0108222 A1 * | 6/2003 | Sato et al. | 382/104 |
| 2004/0008407 A1 * | 1/2004 | Wallerstein et al. | 359/362 |
| 2004/0217851 A1 * | 11/2004 | Reinhart | 340/435 |
| 2005/0094135 A1 * | 5/2005 | Van Den Bossche | 356/139.09 |
| 2005/0128061 A1 * | 6/2005 | Yanai | 340/435 |
| 2005/0140785 A1 * | 6/2005 | Mazzilli | 348/148 |
| 2005/0243172 A1 * | 11/2005 | Takano et al. | 348/148 |
| 2006/0274433 A1 * | 12/2006 | Kamo | 359/793 |
| 2007/0081147 A1 * | 4/2007 | Van Den Bossch | 356/139.09 |
| 2007/0091173 A1 * | 4/2007 | Kade et al. | 348/119 |
| 2008/0129756 A1 * | 6/2008 | Iwano | 345/632 |

FOREIGN PATENT DOCUMENTS

| | | | |
|---|---|---|---|
| DE | 102005051777 A1 | 6/2006 | |
| EP | 1288618 B1 | 4/2007 | |
| JP | 2005293376 A * | 10/2005 | G08G 1/16 |

OTHER PUBLICATIONS

Derwent English Translation Summary of JP2005293376A.*

* cited by examiner

*Primary Examiner* — Jeffrey Shapiro
(74) *Attorney, Agent, or Firm* — Manfred Beck, P.A.

(57) ABSTRACT

A motor vehicle has a wheel-view camera with a wide-angle lens and an image sensor. The wheel-view camera is mounted in the housing of a side view mirror and points in a downward direction such that the wheel-view camera captures a front wheel. An image processing unit is operatively connected to the wheel-view camera unit for receiving image data from the wheel-view camera. The image processing unit is configured to process the image data such that the image processing unit performs a wide-angle lens correction, an image rotation and a viewpoint conversion. A display unit is operatively connected to the image processing unit. The display unit receives processed image data from the image processing unit and displays an image of the front wheel.

15 Claims, 4 Drawing Sheets

MOTOR VEHICLE HAVING A WHEEL-VIEW CAMERA AND METHOD FOR CONTROLLING A WHEEL-VIEW CAMERA SYSTEM

BACKGROUND OF THE INVENTION

Field of the Invention

The invention relates to a motor vehicle having a wheel-view camera system and to a method for controlling a wheel-view camera system.

Automotive cameras are widely used for automotive rear-view applications and safety applications. Cameras are for example used in order to assist a driver during a parking maneuver or when backing up the vehicle. In order to comply with legislative requirements, as well as to improve vehicle occupant and pedestrian safety, automotive camera systems are adapted to increase the driver's situational awareness. In the case of rear-view camera systems, a camera is mounted in the rear of the vehicle, and the corresponding video signal is displayed in the driver's field of view. This is typically achieved on a display screen that is also used for the radio and navigation system.

Video cameras have become widely used as production vehicle sensors in parking assistance and obstacle avoidance systems. New camera systems involving image distortion and alternate viewpoint generation have been developed. For example, a camera system has been developed that utilizes a top-down image viewpoint conversion in order to create a top-down image of the area around the car. Also, a front-mounted camera which can display views looking to the left and to the right of the car has been developed. Video cameras are further used to reduce or eliminate a blind spot in an area behind a vehicle. The monitoring of blind spots with cameras is in particular a concern in the case of large vehicles such as commercial trucks, sports utility vehicles and vans.

An apparatus for checking the blind spots of a vehicle is for example described in U.S. Pat. No. 5,959,555. The blind spot checking apparatus includes a main body, which is installed on the outside of the vehicle and is directed toward an area to be monitored with the help of image sensors. A display apparatus is installed inside the vehicle and displays the graphic information captured by the image sensors. The graphic information can be displayed on a split display screen. Image sensors can be mounted such that the area in front of the vehicle, along the sides of the vehicle and behind the vehicle can be viewed with the image sensors. The area viewed by the image sensors is determined by the installation angle of the image sensors. For example, U.S. Pat. No. 5,959,555 describes that if one wishes to expand the range of the view captured by the image sensors, the installation angle should be adjusted so that the orientation of the image sensors is moved slightly away from the vehicle whereas in the case of a sensor that checks the blind spot in front to the vehicle, the orientation of the image sensor is pointed slightly downward in order to obtain graphic information from close to the bumper. A disadvantage of the blind spot checking apparatus described in U.S. Pat. No. 5,959,555 is that the image sensors require a precise installation angle and that any deviation from the correct installation angle will result in an incorrect range of view.

U.S. Pat. No. 7,248,283 B2 describes a vehicle periphery monitor. A front camera for filming an area stretching forwards is disposed in a front portion of a vehicle. A side camera for filming an area stretching laterally and diagonally forwards is disposed in a lateral-left portion of the vehicle. An indicator display that can be visually recognized by a driver is disposed in a compartment of the vehicle. An amount of change in the direction of the vehicle, that is, a deflection angle of the vehicle is detected on the basis of a vehicle speed and a steering angle of a steering wheel. After the indicator display has started displaying a lateral photo image filmed by the side camera, the photo image displayed by the indicator display is switched from the lateral photo image filmed by the side camera to a front photo image filmed by the front camera if the deflection angle has reached a predetermined angle. A disadvantage of the vehicle periphery monitor is that automatically switching between lateral photo images and front photo images may be confusing or disorienting for the driver.

U.S. Pat. No. 6,580,373 B1 discloses a vehicle-mounted image record system that records images of a portion of the vehicle and the surface of the road in the vicinity of the vehicle. The system includes one or more cameras mounted on the vehicle and a recording device for recording the images captured by the cameras. The captured and recorded images include a portion of the vehicle and part of the surface of the road on which the vehicle is driving. The system also includes a display for displaying the captured images so that the driver of the vehicle can see objects in front of or behind the vehicle.

German Patent Application Publication No. DE 10 2005 051 777 A1 discloses a view support system for parking a vehicle. The system includes a camera at the rear of the vehicle, a camera on the driver's side of the vehicle and a camera on the passenger's side of the vehicle. The system processes the images provided by the cameras and generates a bird's eye view of the area surrounding the vehicle. The display of the bird's eye view is used to assist the driver during parking maneuvers.

U.S. Pat. No. 7,161,616 B1 describes an image processing device for generating a synthetic image that has a virtual point of view above a vehicle. The synthetic image is generated through the use of images captured by a plurality of cameras mounted on the vehicle. In the synthetic image, an illustration image or an actual image of the vehicle is displayed in a vehicle region in which the vehicle is present. The area around the vehicle that is not shot by any of the cameras is displayed as a blind spot region. The image processing device is designed to provide a bird's eye overview of the vehicle's position in relation other vehicles but does not provide a close-up view of the vehicle itself.

U.S. Pat. No. 6,801,127 discloses a driving assistance display apparatus for displaying an image around a vehicle shot by a vehicle-mounted camera. In correspondence with each face of a rectangular parallelepiped obtained when the inside of the rectangular parallelepiped is shot, a monitor screen is split into a plurality of sub-screen areas. An image shot by a vehicle-mounted camera is processed and the processed image is split correspondingly to the sub-screen areas. Each split image is displayed in the corresponding sub-screen areas in order to provide a three-dimensional overview on a two-dimensional screen.

U.S. Pat. No. 6,954,152 B1 discloses a side view mirror and camera assembly for providing a mirror combined with a camera directed towards the blind spot of the mirror to allow a driver of a vehicle to view objects near the vehicle that are not viewable using the side view mirror alone. The side view mirror and camera assembly includes an adjustable camera coupled to a side view mirror housing to show a view of the blind spot of the side view mirror on a display viewable by a driver of a vehicle. The camera assembly is intended to reduce or eliminate the blind spot of the side view mirror but is not configured to look downward in order to view objects directly adjacent to the front wheel of the vehicle.

SUMMARY OF THE INVENTION

It is accordingly an object of the invention to provide a motor vehicle having a wheel-view camera and a corresponding method for controlling a wheel-view camera system which overcome the above-mentioned disadvantages of the heretofore-known systems and methods of this general type and which allow increasing the driver's awareness of the presence of pedestrians and obstacles in the immediate vicinity of the vehicle and which further assist in avoiding oncoming obstacles when driving at low speed and which can also assist in parking maneuvers, lane-keeping or lane changing maneuvers while driving. A further object of the invention is to provide a motor vehicle having a wheel-view camera system which can be implemented in a cost-effective manner and which can be easily adapted for different automotive applications. Another object of the invention is to provide a motor vehicle having a camera system which improves the driver's ability to gauge depth and distance to objects that are close to the vehicle. A further object of the invention is to provide a motor vehicle having a wheel-view camera that is integrated in an aesthetically pleasing manner in the vehicle exterior.

With the foregoing and other objects in view there is provided, in accordance with the invention, a motor vehicle, including:

a vehicle body;

front wheels;

a wheel-view camera with a wide-angle lens and an image sensor, the wheel-view camera being mounted on the vehicle body and pointing in a downward direction such that the wheel-view camera captures one of the front wheels;

an image processing unit operatively connected to the wheel-view camera unit for receiving image data from the wheel-view camera, the image processing unit being configured to process the image data such that the image processing unit performs a wide-angle lens correction, an image rotation and a viewpoint conversion; and a display unit operatively connected to the image processing unit, the display unit receiving processed image data from the image processing unit and displaying an image of one of the front wheels.

An advantage of the above-defined motor vehicle is that it allows a driver to view objects in the path of the front wheel, pavement markings in parking lots or road lane markings. The driver also can view the steering angle of the front wheel which is in particular helpful during parking maneuvers. By performing a wide-angle correction, an image rotation and a viewpoint conversion, the driver is presented with an improved image that makes it easier to steer the vehicle when parking the vehicle or when trying to keep the vehicle in its driving lane.

In accordance with another feature of the invention, a control unit is operatively connected to the image processing unit; vehicle sensors are operatively connected to the control unit; the vehicle sensors provide vehicle sensor data to the control unit; and the control unit controls the image processing unit in dependence on the vehicle sensor data.

In accordance with another feature of the invention, the vehicle sensors include a steering angle sensor for providing steering angle data to the control unit; and the control unit controls the image processing unit in dependence on the steering angle data such that the display unit displays a relatively smaller portion of a side of the vehicle body in case of a relatively smaller steering angle and such that the display unit displays a relatively larger portion of a side of the vehicle body in case of a relatively larger steering angle.

In accordance with a further feature of the invention, the vehicle sensors include a steering angle sensor for providing steering angle data to the control unit; the control unit controls the image processing unit in dependence on the steering angle data such that the display unit displays a close-up view of one of the front wheels in case of a relatively smaller steering angle and such that the display unit displays a wide-angle view in case of a relatively larger steering angle.

In accordance with another feature of the invention, the vehicle sensors include a vehicle speed sensor for providing vehicle speed data to the control unit; and the control unit controls the image processing unit in dependence on the vehicle speed data such that the display unit displays a close-up view of one of the front wheels in case of a relatively smaller vehicle speed and such that the display unit displays a wide-angle view in case of a relatively larger vehicle speed.

In accordance with yet another feature of the invention, the wheel-view camera is mounted on the vehicle body on a driver-opposite side of the vehicle body. A low-cost embodiment of the camera system could include only one wheel-view camera mounted on the driver-opposite side of the vehicle.

In accordance with another feature of the invention, the vehicle body includes a side view mirror having a housing; and the wheel-view camera is mounted in the housing of the side view mirror.

In accordance with another feature of the invention, the image processing unit performs a viewpoint conversion such that the display unit displays an image having a virtual viewpoint positioned at a given distance away from the side view mirror and looking down toward the one of the front wheels.

In accordance with another feature of the invention, the wheel-view camera is a first wheel-view camera; a second wheel-view camera is mounted on the vehicle body, the first and the second wheel-view camera are mounted on opposite sides of the vehicle body; and the display unit has a split screen for simultaneously displaying an image of a left one and a right one of the front wheels.

In accordance with another feature of the invention, a digital data storage device is operatively connected to the image processing unit for storing image data.

In accordance with another feature of the invention, a control unit is operatively connected to the image processing unit; the control unit is configured to evaluate image data in order to monitor road lane markings and to generate a lane departure warning signal.

In accordance with another feature of the invention, a control unit is operatively connected to the image processing unit; the control unit is configured to evaluate image data in order to monitor a presence of nearby vehicles; and the control unit generates a lane change warning signal if a lane change maneuver is determined to be unsafe.

In accordance with another feature of the invention, a control unit is operatively connected to the image processing unit; a steering wheel is operatively connected to the control unit; the control unit is configured to evaluate image data in order to monitor road lane markings and to generate a heading control signal; and the steering wheel is provided with a torque in dependence on the heading control signal.

With the objects of the invention in view there is also provided, a method for controlling a wheel-view camera system, the method includes the steps of:

providing a wheel-view camera having a wide-angle lens, the wheel-view camera being mounted on a body of a vehicle and pointing in a downward direction such that the wheel-view camera captures a front wheel of the vehicle;

processing image data from the wheel-view camera by performing a wide-angle lens correction, an image rotation and a viewpoint conversion;

transmitting processed image data to a display unit provided in the vehicle; and displaying, with the display unit, an image of the front wheel of the vehicle.

Another mode of the method according to the invention includes processing image data from the wheel-view camera in dependence on steering angle data such that the display unit displays a relatively smaller portion of a side of the body of the vehicle in case of a relatively smaller steering angle and such that the display unit displays a relatively larger portion of a side of the body of the vehicle in case of a relatively larger steering angle.

A further mode of the method according to the invention includes processing image data from the wheel-view camera in dependence on steering angle data such that the display unit displays a close-up view of the front wheel in case of a relatively smaller steering angle and such that the display unit displays a wide-angle view in case of a relatively larger steering angle.

Another mode of the method according to the invention includes processing image data from the wheel-view camera in dependence on vehicle speed data such that the display unit displays a close-up view of the front wheel in case of a relatively smaller vehicle speed and such that the display unit displays a wide-angle view in case of a relatively larger vehicle speed.

A further mode of the method according to the invention includes processing image data from the wheel-view camera by performing a viewpoint conversion such that the display unit displays an image having a virtual viewpoint positioned at a given distance away from a side view mirror of the vehicle and looking down toward the front wheel of the vehicle.

Another mode of the method according to the invention includes providing a further wheel-view camera, the wheel-view camera and the further wheel-view camera being mounted on opposite sides of the body of the vehicle; and simultaneously displaying an image of both front wheels on a split screen of the display unit.

Another mode of the method according to the invention includes storing image data from the wheel view camera on a digital data storage device provided in the vehicle.

Advantages of the above-defined wheel-view camera system are the versatility and flexibility of a fixedly mounted camera. Specifically, virtual viewpoints, viewing angles or fields of view and the distortion correction can be adjusted.

Other features which are considered as characteristic for the invention are set forth in the appended claims.

Although the invention is illustrated and described herein as embodied in a motor vehicle having a wheel-view camera and in a method for controlling a wheel-view camera system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
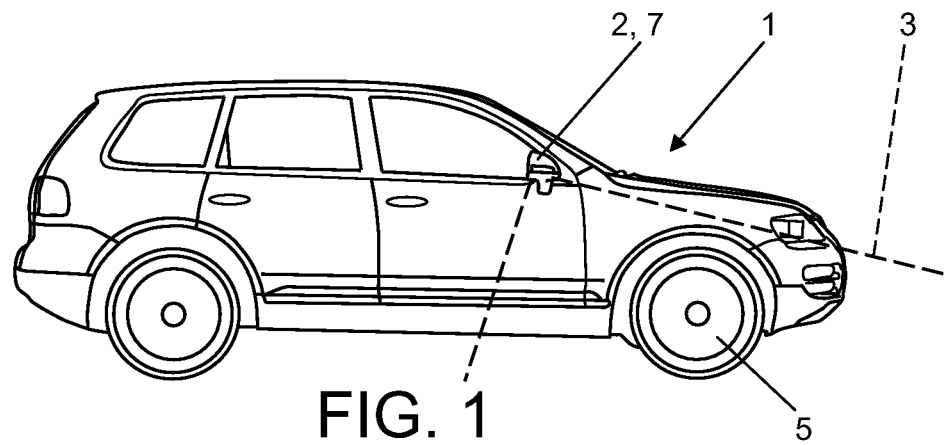
FIG. 1 is a diagrammatic side view of a motor vehicle for illustrating a mounting location of a wheel-view camera in a side view mirror of the motor vehicle and for illustrating a target field of view in accordance with the invention.

Referring now to the figures of the drawings in detail and first, particularly, to FIG. 1 thereof, there is shown a diagrammatic side view of a motor vehicle 1 for illustrating a mounting location of a wheel-view camera in a side view mirror 2 of the motor vehicle 1. The target field of view 3 is illustrated in an exemplary manner by dashed lines. The wheel-view camera 4 has a wide-angle lens 15 and is mounted such that the viewing direction of the camera 4 is substantially downward. The target field of view captures at least a front wheel 5 of the motor vehicle 1. A wide-angle lens 15 is a lens having a focal length that is substantially shorter than the focal length of a normal lens wherein a normal lens is considered a lens that generates an image that has a perspective similar to human eyesight.

The area around the front wheel 5 of the motor vehicle 1 is captured by a wheel-view camera 4 mounted in the side view mirror 2. The preferred mounting position of the wheel-view camera 4 is selected such that the wheel-view camera is fully enclosed by the housing 7 of the side view mirror 2. Also, mounting the wheel-view camera 4 in the side view mirror 2 allows an aesthetically pleasing integration of the camera 4 without requiring sacrifices as far as the vehicle design and aesthetic quality is concerned.

Figure 2:
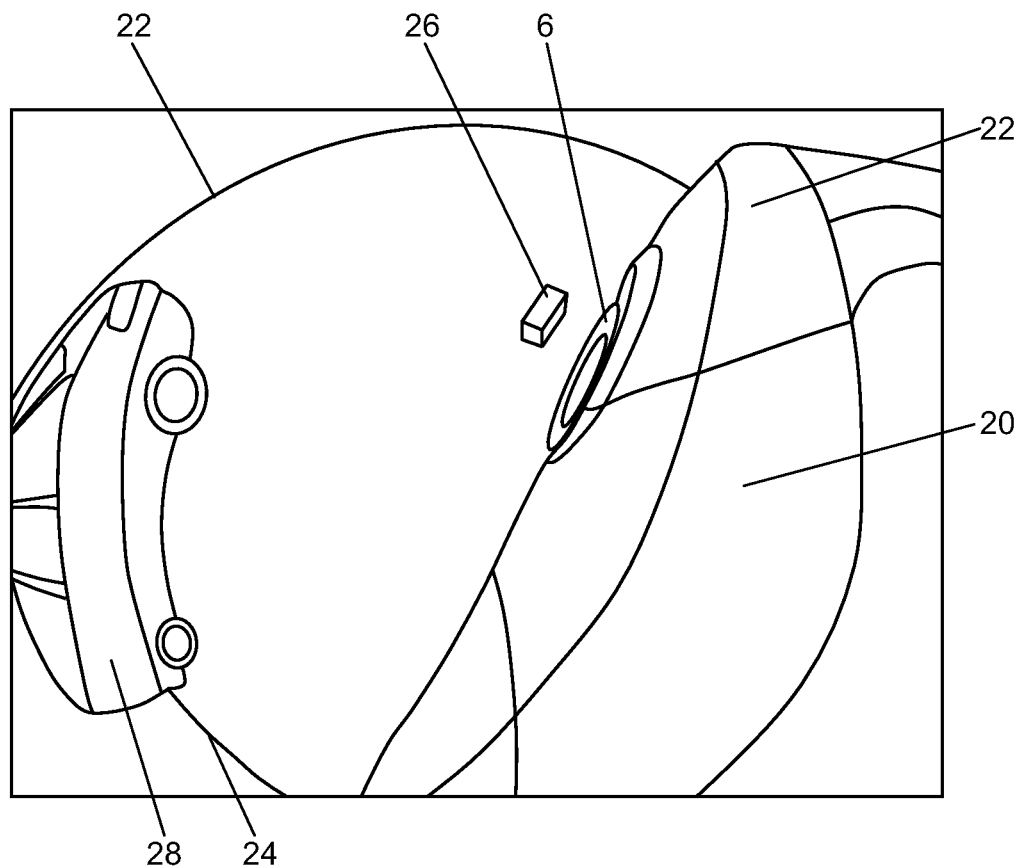
FIG. 2 is a diagrammatic view of a screen capture of a wheel-view camera according to the invention capturing the left side and the left front wheel of the motor vehicle with a wide-angle lens.
Figure 3:
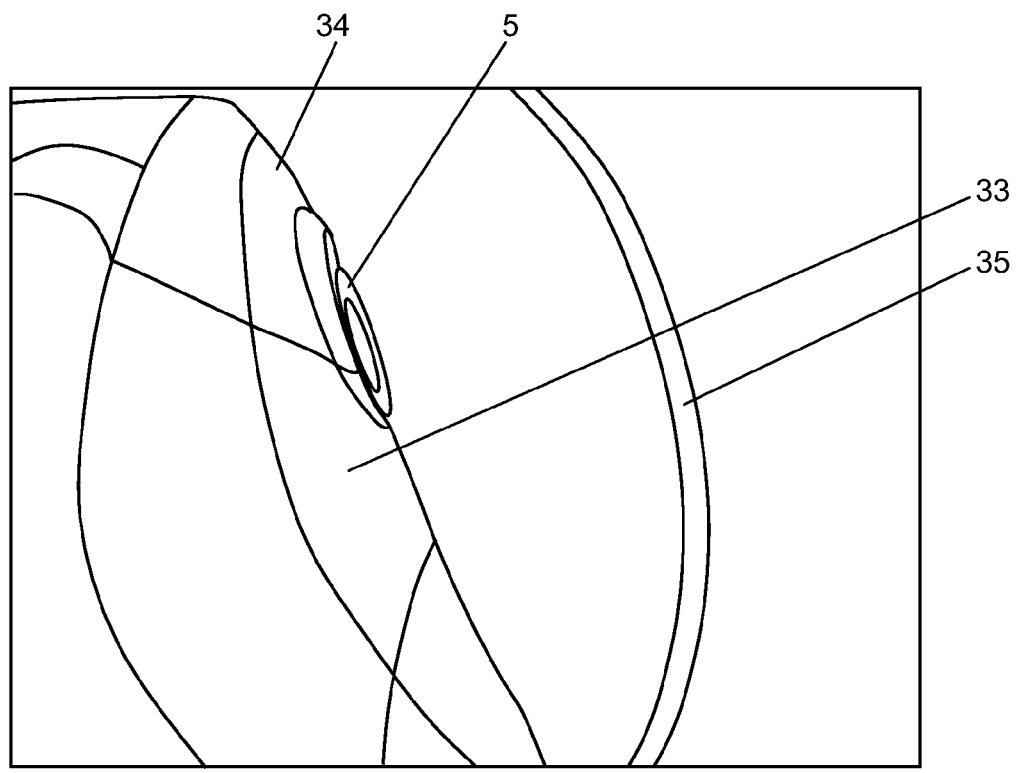
FIG. 3 is a diagrammatic view of a screen capture of a wheel-view camera according to the invention capturing the right side and the right front wheel of the motor vehicle with a wide-angle lens.

Preferably, one wheel-view camera 4 is mounted on the right side of the vehicle 1 and one wheel-view camera 10 is mounted on the left side of the vehicle 1. Coupling the image sensors 8, 18 of the wheel-view cameras 4, 10 with the wide-angle lenses 15, 11 generates a view which displays the area around the vehicle 1 as illustrated in FIGS. 2 and 3. The image, i.e. the video feed that is provided by the wheel-view cameras 4, 10 is limited by line-of sight and by the viewing angle of the lenses 15, 11. An exemplary embodiment of the wheel-view camera 4, 10 includes a 1.3 mega-pixel image sensor 8 coupled with a wide-angle lens 15 having a field of view of 188 degrees.

FIG. 2 shows in a diagrammatic manner a screen capture of the wheel-view camera 10 mounted in the side view mirror on the left side of the motor vehicle 1. The wheel-view camera 10 has a wide-angle lens 11 which provides a view of the left front door 20 on the left side of the motor vehicle 1, the left front fender 22 and the left front wheel 6. The wheel-view camera also captures objects or people that are to the left of the motor vehicle 1. Due to the wide-angle lens 11 of the wheel-view camera 10, the screen image on the display is distorted. As a result of the distortion, straight lines are displayed as curved lines 22, 24. The screen capture shown in FIG. 2 shows for example a further motor vehicle 28 that is positioned to the left of the motor vehicle 1 having the wheel-view camera 10. The wheel-view camera 10 also captures an object 26 that is positioned on the ground near the left front wheel 6 of the motor vehicle 1. The camera screen capture of FIG. 2 is a wide-angle view without a distortion correction.

FIG. 3 shows in a diagrammatic manner a screen capture of the wheel-view camera 4 mounted in the side view mirror 2 on the right side of the motor vehicle 1. The wheel-view camera 4 on the right side also has a wide-angle lens 15 which provides a view of the right front door 33, the right front fender 34 and the right front wheel 5. The wheel-view camera 4 on the right side of the motor vehicle 1 captures objects or people that are on the right side of the motor vehicle 1. Just like FIG. 2, the camera screen capture of FIG. 3 is a wide-angle view without a distortion correction. Straight lines such as road markings or parking space markings 35 are displayed as curves lines.

An exemplary embodiment of the wheel-view camera 4, 10 utilizes a 1.3 mega-pixel image sensor (imager) 8, 18 with a 188 degree field of view wide-angle lens 11, 15. Such an image sensor 8, 18 with a wide-angle lens 11, 15 is for example part of a wheel-view camera module that has a built-in digital signal processor which is capable of delivering custom views, distortions, and settings. For a wide-angle view as illustrated in FIGS. 2 and 3, the wheel-view camera system may utilize the full field of view of the wheel-view camera 4, 10 of for example 188 degrees. The wheel-view camera is pointed downwards in order to capture the front wheel 5, 6 of the motor vehicle 1.

Figure 4:
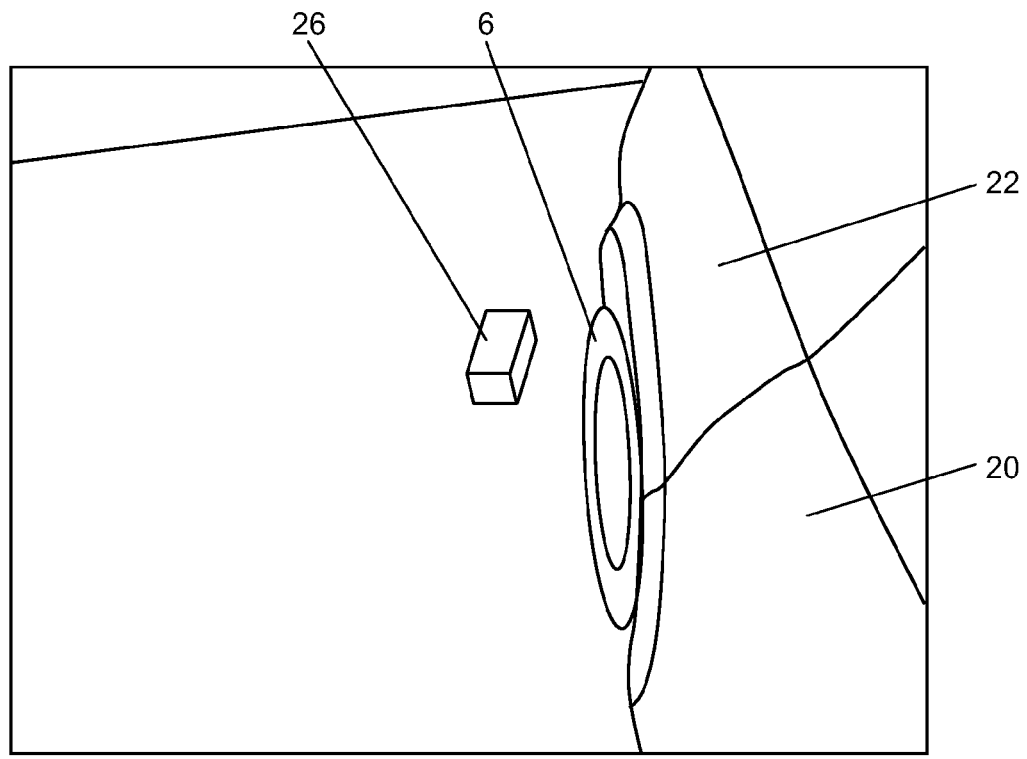
FIG. 4 is a diagrammatic view of a screen capture of a wheel-view camera according to the invention capturing the left side and the left front wheel of the motor vehicle using a distortion correction.
Figure 5:
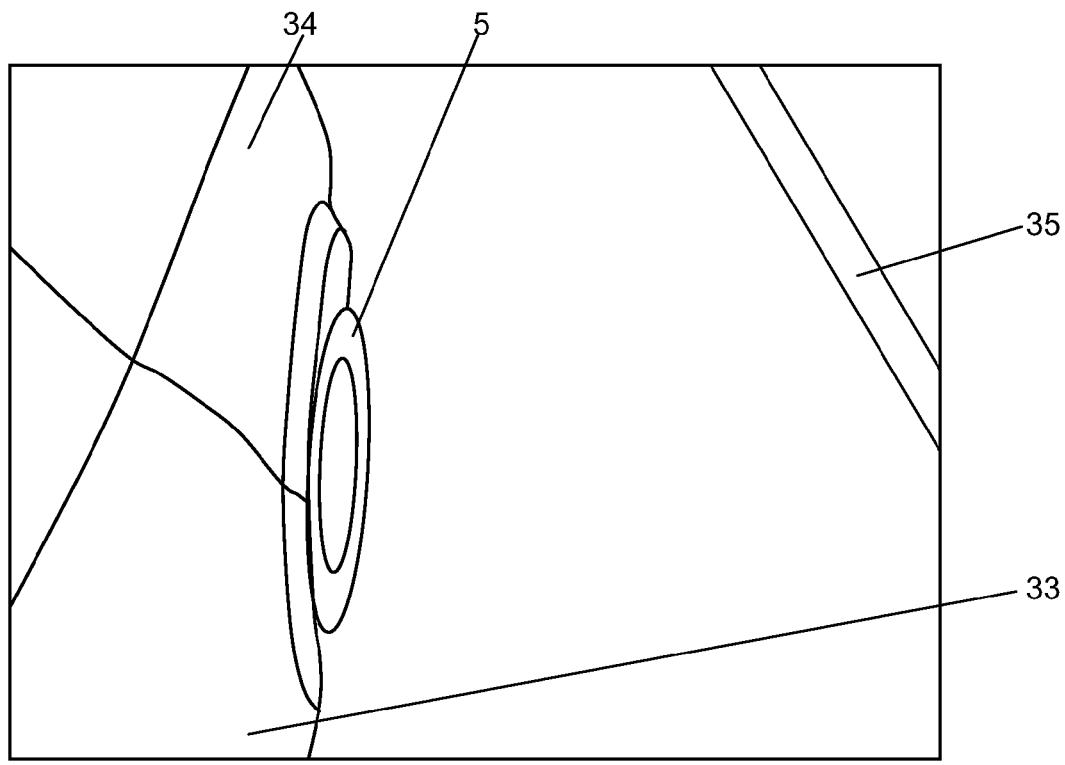
FIG. 5 is a diagrammatic view of a screen capture of a wheel-view camera according to the invention capturing the right side and the right front wheel of the motor vehicle using a distortion correction.
Figure 6:
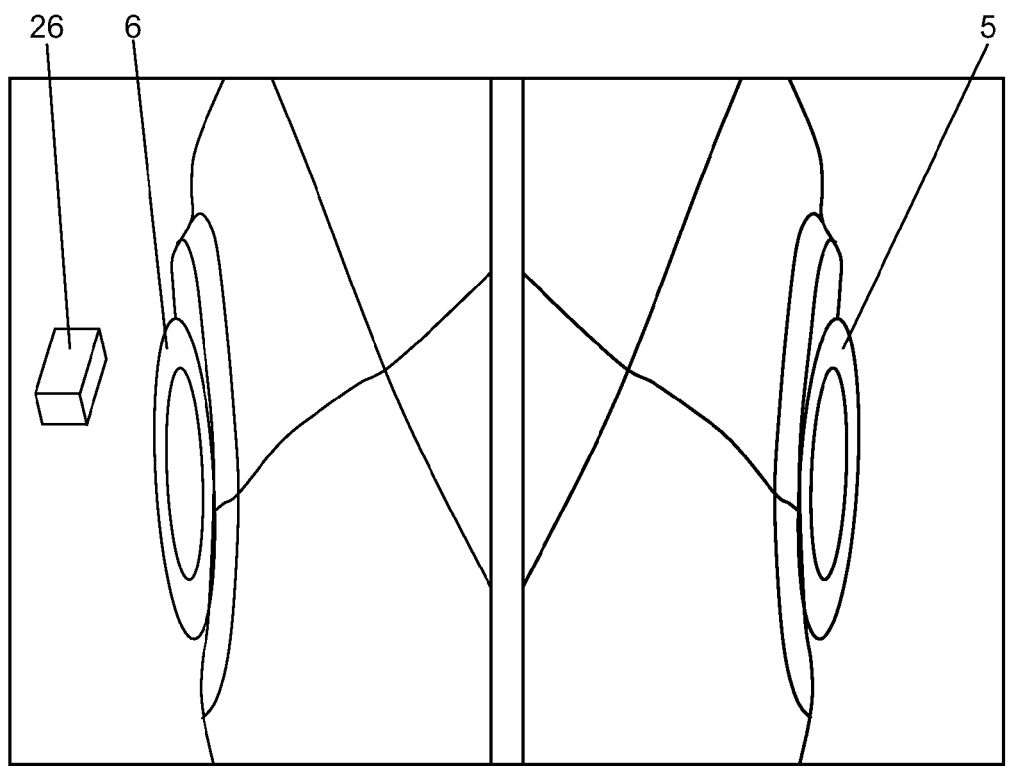
FIG. 6 is a diagrammatic view of a split screen camera display that shows both sides of the motor vehicle on a display screen in accordance with the invention.

The image sensor 8, 18 in combination with the wide-angle lens 11, 15 creates a video feed which is dependent on the orientation of the wheel-view camera 4, 10. Image distortion correction is necessary to compensate for this, and generate a camera view which is independent of the camera's mounting orientation. A distortion processing of the wide-angle image can be used to generate a perspective which more clearly displays the area around the front wheel as is illustrated in FIGS. 4 to 6. The distortion processing or distortion correction of the image includes a rotation, a wide-angle lens correction, and a viewpoint conversion in order to generate a perspective which appears to be looking at the front wheel 5, 6 from several feet away from the vehicle 1. In accordance with an embodiment of the wheel-view camera according to the invention, the distortion processing or image processing is accomplished by an on-board digital signal processing (DSP) on the camera units. Camera units that are suitable for the wheel-view camera system according to the invention are for example manufactured by SONY. Alternatively, off-board processing techniques may be utilized to achieve the same effects in terms of image viewpoint conversion and lens distortion correction.

FIG. 4 is a diagrammatic view of a screen capture of a wheel-view camera 10 according to the invention capturing the left side and the left front wheel 6 of the motor vehicle 1 wherein a distortion correction is used in order to generate a view which more clearly displays the area around the left front wheel 6 of the motor vehicle 1. The distortion correction of the image data provided by the pixel image sensor 18 includes a rotation of the image, a wide-angle lens correction, and a viewpoint conversion in order to generate a perspective which appears to be looking at the front wheel 6 from several feet away from the vehicle 1. The distortion-corrected image allows the driver to view objects that are next to the front wheel, such as the object 26 to the left of the front wheel 6 shown in FIGS. 2 and 4, or objects that are in the path of the front wheel. The driver also can view the steering angle of the front wheel 6 which is in particular helpful during parking maneuvers.

FIG. 5 is a diagrammatic view of a screen capture of a wheel-view camera according to the invention capturing the right side and the right front wheel 5 of the motor vehicle 1 wherein a distortion correction is used in order to generate a view which more clearly displays the area around the right front wheel 5 of the motor vehicle 1. As described above, the distortion correction or image processing includes a rotation of the image, a wide-angle lens correction, and a viewpoint conversion. The driver will see the right front wheel 5 as if the wheel-view camera were positioned several feet away from the vehicle 1.

FIG. 6 is a diagrammatic view of a split screen camera display that shows both sides of the motor vehicle 1 on a display screen in accordance with the invention. The display screen shown in FIG. 6 combines the image information of the screen captures shown in FIGS. 4 and 5. As can be seen in FIGS. 4, 5 and 6, the distortion correction makes it easier for the driver to gauge depth and estimate a distance between the front wheel 6 and an object 26 or obstacle. It is therefore easier for the driver to perform parking maneuvers and avoid obstacles at low speeds. When viewing the wheel-view video feed, the driver can clearly see any objects in the path of the wheels, can align the vehicle to a curb or painted line for parking, or can observe distances to nearby objects for centering within a driving lane or parking space.

The wheel-view camera system allows the driver to see a real-time video feed of the area around the vehicle's front wheels which increases awareness of the presence of pedestrians, assists in avoiding oncoming obstacles when driving at low speed, and assists in parking maneuvers or lane-keeping and lane changing while driving.

Displaying the images from the left and the right wheel-view camera simultaneously to the driver requires switching between the two camera images. Displaying both images to the driver can be done with FPGA (field programmable gate array), DSP (digital signal processing) or PC (personal computer) based technology. In order to reduce system costs, the wheel-view camera system may be configured such that the display unit displays a single side wheel-view to the driver.

The display unit 40 is positioned within sight of the driver in order to assist in driving maneuvers and safety applications. This is achieved by utilizing a display screen which is normally reserved for an audio and navigation system interface, or by having a dedicated display unit mounted within the driver's view. The wheel-view camera system can also be displayed to the front or rear passengers for entertainment purposes. As will be further explained below, the wheel-view camera system can be configured to be controlled in dependence on vehicle information or vehicle operation date in order to change the camera viewpoint or field of view in real time. For example, the wheel-view camera system may be modified to show a wheel-view when travelling straight and to change the angle and/or zoom of the video feed in order to display a view of the entire side of the vehicle when executing an extreme steering maneuver.

Figure 7:
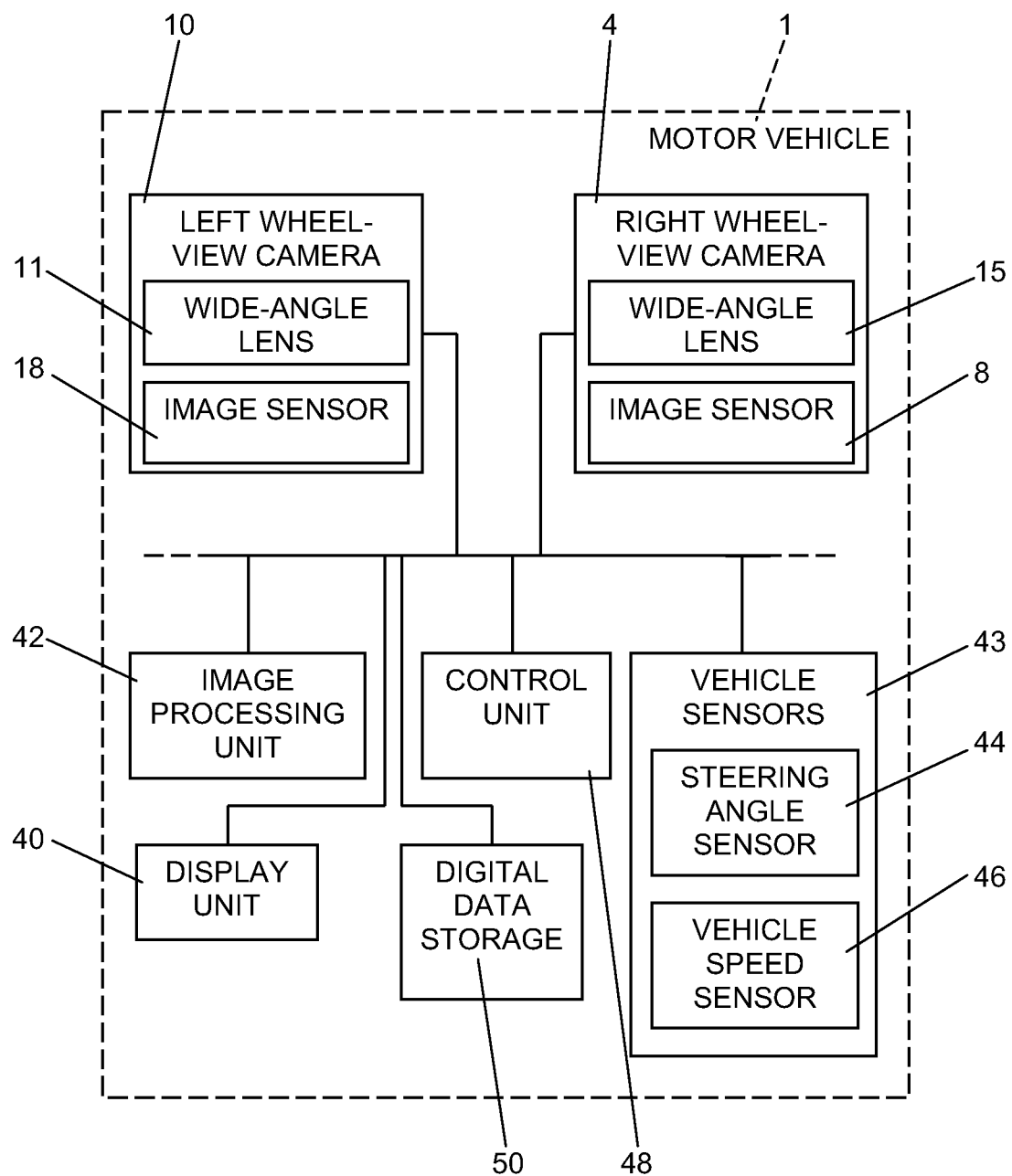
FIG. 7 is a block diagram illustrating functional blocks of a motor vehicle equipped with wheel-view cameras according to the invention.

FIG. 7 is a block diagram illustrating components of a motor vehicle 1 equipped with wheel-view cameras 4, 10 according to the invention. The motor vehicle 1 is schematically indicated by a dashed line. The various blocks of the diagram of FIG. 7 are to be understood as functional blocks rather than separate hardware components. A person of skill in the art will understand that functions may be performed by hardware or software or by a combination of both. A left wheel-view camera 10 includes a wide-angle lens 11 and an image sensor 18. In the same manner, the right wheel-view camera 4 includes a wide-angle lens 15 and an image sensor 8. The left wheel-view camera 10 is mounted in the left side view mirror and accordingly the right wheel-view camera 4 is mounted in the right side view mirror 2 of the motor vehicle 1. The image sensors 8, 18 of the wheel-view cameras 4, 10 can be embodied in a conventional manner such as a CCD (charge-coupled device) image sensor or a CMOS (complementary metal oxide semiconductor) image sensor. The image sensors 8, 18 convert the image captured by the wide-angle lenses 11, 15 into electrical signals which are supplied to an image processing unit 42. The wheel-view cameras 4, 10 are set up such that the wide-angle lenses 11, 15 can capture a field of view of approximately 180 degrees. The image processing unit 42 operates to reduce an image distortion caused by the wide-angle lenses 11, 15. A real-time image or video distortion processing can be achieved using FPGA (field programmable gate array) or DSP (digital signal processor) technology.

A display unit 40 displays the screen images generated from the image data provided by the left wheel-view camera 10 and by the right wheel-view camera 4. The display unit 40 preferably displays a split screen as illustrated in FIG. 6, which allows the driver to see both sides of the motor vehicle 1. Vehicle sensors 43 such as a steering angle sensor 44 and a vehicle speed sensor 46 provide vehicle operation data such as a vehicle speed, a steering angle, and a selected gear. The vehicle operation data are provided to the control unit 48 which uses the vehicle operation data in order to control the image processing unit 42 and the display unit 40.

A basic embodiment of the wheel-view camera system provides a distortion-corrected video feed corresponding to the images shown in FIGS. 4 to 6. This would allow the driver to see the front wheels of the motor vehicle 1 and any objects or obstacles next to the wheel.

In accordance with another embodiment, the wheel-view camera system is controlled by using the vehicle operation data in order to change the viewpoint of the wheel-view cameras in real time. For example, the wheel-view camera system can be configured such that the control unit 48 causes the display unit 40 to show a wheel-view as illustrated in FIGS. 4 to 6 when travelling substantially straight and such that the control unit changes the angle and/or zoom of the video feed in order to cause the display unit 40 to display a view of the entire side of the motor vehicle 1 when executing an extreme steering maneuver.

In accordance with another embodiment, the control unit 48 will cause the display unit 40 to provide a close-up view of the wheels 5, 6 at low speeds in order to assist during low speed parking maneuvers. At higher speeds, the display unit 40 will show a wide-angle view providing a lateral view similar to that shown in FIGS. 2 and 3 in order to assist the driver in lane change maneuvers.

In accordance with another embodiment, the control unit 48 uses the steering angle data in addition to the vehicle speed data in order to optimize the view of the path of travel of the motor vehicle 1. In other words, if the wheels 5, 6 point for example to the left, then the control unit 48 causes the display unit 40 to provide a view that allows the driver to view further to the left than when the wheels are pointed straight ahead. The display unit 40 can thus be controlled such that it can transition between wide-angle views and close-up views and such that the view can be aimed in different directions. The display unit may be configured to perform a smooth transition between wide-angle views and close-up views with a transition duration between 0.5 seconds and 2 seconds, and preferably with a duration of about 1 second. A smooth transition allows the driver to follow the transition movement and prevents the driver from becoming disoriented.

In accordance with a further embodiment, an overlay geometry is added to the video image wherein the overlay geometry indicates a projected travel path of the front wheels 5, 6. For example, when the left front wheel 6 points to the left, then the overlay geometry would be a curve extending from the left front wheel 6 leftwards along a projected travel path according to the current steering angle. The camera system can thus be modified for different safety applications such as parking maneuver assist, lane keeping assist, blind spot warning, or heading control.

In accordance with an embodiment of the invention, image data are evaluated in order to monitor road lane markings and to generate a lane departure warning signal. In accordance with another embodiment of the invention, the image data are evaluated in order to monitor a presence of vehicles in adjacent lanes and to generate a lane change warning signal if a lane change maneuver is determined to be unsafe. In accordance with another embodiment of the invention, the image data are evaluated in order to monitor road lane markings and to generate a heading control signal. The steering wheel is provided with a torque in dependence on the heading control signal in order to provide a lane-keeping assist for the driver. In accordance with an embodiment of the invention, the wheel-view cameras, the image processing unit, the control unit, the display unit and the vehicle sensors are connected via a CAN (Controller Area Network) bus system.

The use of the wheel-view camera system according to the invention can be extended to include a hard-drive or digital data storage 50 for storing a video output for the purpose of downloading the video output to a personal computer and/or sharing the video output online, for storing or downloading screen captures, for a remote download or for in-car viewing of a video feed.

The wheel-view camera system described above, has the advantage of increasing driver awareness of near-field obstacles which are not observable from the driver's point of view. The wheel-view camera system which uses wide-angle lenses in combination with an image processing as described above, improves flexibility in terms of camera mounting possibilities and improves the adaptability of the wheel-view cameras to new applications. The above-described on board digital signal processing advantageously allows quick product changes and upgrades and thus the same basic hardware may be used for different vehicle platforms. Further advantages of the wheel-view camera system are that it increases driving enjoyment and also increases the driver's control of a large vehicle.

Applications for a wheel-view system according to the invention include its use as a safety aid for pedestrian avoidance. The wheel-view cameras may be used as dual-purpose or multi-purpose cameras that provide not only assistance during parking maneuvers such as parallel parking but also provide a lane departure warning, a lane-keeping assistance and may assist the driver as heading control system. The wheel-view camera system is in particular suited for avoiding obstacles on the road or during low-speed maneuvers. Thus damage to wheel rims and vehicle tires may be prevented. Further applications for a wheel-view system according to the invention may include storing video feeds or screen captures for remote downloading or in-car viewing. A low-cost configuration may be equipped with only one wheel-view camera for providing a single driver-opposite view of the wheel area. The wheel-view camera system may also be used to meet regulatory requirements with respect to driver awareness in large vehicles which in some countries may require the use of cameras or mirrors for viewing the driver-opposite-side of the motor vehicle 1.

What is claimed is:

1. A motor vehicle, comprising:
   a vehicle body;
   front wheels;
   a wheel-view camera with a wide-angle lens and an image sensor, said wheel-view camera being mounted on said vehicle body and pointing in a downward direction such that said wheel-view camera captures one of said front wheels;
   an image processing unit operatively connected to said wheel-view camera for receiving image data from said wheel-view camera, said image processing unit being configured to process the image data such that said image processing unit performs a wide-angle lens correction, an image rotation and a viewpoint conversion;
   a display unit operatively connected to said image processing unit, said display unit receiving processed image data from said image processing unit and displaying an image of said one of said front wheels;
   said vehicle body having a side view mirror with a housing;
   said wheel-view camera being mounted in said housing of said side view mirror;
   said image processing unit performing the viewpoint conversion such that said display unit displays an image having a virtual viewpoint positioned at a given distance away from said side view mirror and looking down toward said one of said front wheels;
   a control unit operatively connected to said image processing unit;
   vehicle sensors operatively connected to said control unit, said vehicle sensors providing vehicle sensor data to said control unit;
   said control unit controlling said image processing unit in dependence on the vehicle sensor data;
   said vehicle sensors including a steering angle sensor for providing steering angle data to said control unit; and
   said control unit controlling said image processing unit in dependence on the steering angle data such that said display unit displays a relatively smaller portion of a side of said vehicle body in case of a relatively smaller steering angle and such that said display unit displays a relatively larger portion of a side of said vehicle body in case of a relatively larger steering angle.

2. The motor vehicle according to claim 1, wherein said control unit controls said image processing unit in dependence on said steering angle data such that said display unit displays a close-up view of said one of said front wheels in case of a relatively smaller steering angle and such that said display unit displays a wide-angle view in case of a relatively larger steering angle.

3. The motor vehicle according to claim 1, wherein:
   said vehicle sensors include a vehicle speed sensor for providing vehicle speed data to said control unit; and
   said control unit controls said image processing unit in dependence on the vehicle speed data such that said display unit displays a close-up view of said one of said front wheels in case of a relatively smaller vehicle speed and such that said display unit displays a wide-angle view in case of a relatively larger vehicle speed.

4. The motor vehicle according to claim 1, wherein said wheel-view camera is mounted on said vehicle body on a driver-opposite side of said vehicle body.

5. The motor vehicle according to claim 1, wherein:
   said wheel-view camera is a first wheel-view camera;
   a second wheel-view camera is mounted on said vehicle body, said first and said second wheel-view camera are mounted on opposite sides of said vehicle body; and
   said display unit has a split screen for simultaneously displaying an image of a left one and a right one of said front wheels.

6. The motor vehicle according to claim 1, including a digital data storage device operatively connected to said image processing unit for storing image data.

7. The motor vehicle according to claim 1, wherein said control unit is configured to evaluate image data in order to monitor road lane markings and to generate a lane departure warning signal.

8. The motor vehicle according to claim 1, wherein:
   said control unit is configured to evaluate image data in order to monitor a presence of nearby vehicles; and
   said control unit generates a lane change warning signal if a lane change maneuver is determined to be unsafe.

9. The motor vehicle according to claim 1, including:
   a steering wheel operatively connected to said control unit;
   said control unit being configured to evaluate image data in order to monitor road lane markings and to generate a heading control signal; and
   said wheel-view camera, said image processing unit and said control unit forming a heading control system configured to provide a lane-keeping assistance by causing a torque to be supplied to said steering wheel in dependence on the heading control signal.

10. A method for controlling a wheel-view camera system, the method which comprises:
    providing a wheel-view camera having a wide-angle lens, the wheel-view camera being mounted on a body of a vehicle and pointing in a downward direction such that the wheel-view camera captures a front wheel of the vehicle;
    processing image data from the wheel-view camera by performing a wide-angle lens correction, an image rotation and a viewpoint conversion;
    transmitting processed image data to a display unit provided in the vehicle;
    displaying, with the display unit, an image of the front wheel of the vehicle such that the display unit displays an image having a virtual viewpoint positioned at a given distance away from a side view mirror of the vehicle and looking down toward the front wheel of the vehicle; and
    processing image data from the wheel-view camera in dependence on steering angle data such that the display unit displays a close-up view of the front wheel in case of a relatively smaller steering angle and such that said display unit displays a wide-angle view in case of a relatively larger steering angle.

11. The method according to claim 10, which comprises processing image data from the wheel-view camera in dependence on steering angle data such that the display unit displays a relatively smaller portion of a side of the body of the vehicle in case of a relatively smaller steering angle and such that the display unit displays a relatively larger portion of a side of the body of the vehicle in case of a relatively larger steering angle.

12. The method according to claim 10, which comprises processing image data from the wheel-view camera in dependence on vehicle speed data such that the display unit displays a close-up view of the front wheel in case of a relatively smaller vehicle speed and such that the display unit displays a wide-angle view in case of a relatively larger vehicle speed.

13. The method according to claim 10, which comprises:
providing a further wheel-view camera, the wheel-view camera and the further wheel-view camera being mounted on opposite sides of the body of the vehicle; and
simultaneously displaying an image of both front wheels of the vehicle on a split screen of the display unit.

14. The method according to claim 10, which comprises storing image data from the wheel-view camera on a digital data storage device provided in the vehicle.

15. A method for controlling a wheel-view camera system, the method which comprises:
providing a wheel-view camera having a wide-angle lens, the wheel-view camera being mounted on a body of a vehicle and pointing in a downward direction such that the wheel-view camera captures a front wheel of the vehicle;
processing image data from the wheel-view camera by performing a wide-angle lens correction, an image rotation and a viewpoint conversion;
transmitting processed image data to a display unit provided in the vehicle;
displaying, with the display unit, an image of the front wheel of the vehicle such that the display unit displays an image having a virtual viewpoint positioned at a given distance away from a side view mirror of the vehicle and looking down toward the front wheel of the vehicle; and
processing image data from the wheel-view camera in dependence on vehicle speed data such that the display unit displays a close-up view of the front wheel in case of a relatively smaller vehicle speed and such that the display unit displays a wide-angle view in case of a relatively larger vehicle speed.

* * * * *